Nov. 21, 1961     O. H. DARLINGTON, JR     3,010,011

STUD WELDING PROCESS

Filed Aug. 31, 1959

*INVENTOR*

BY Oscar H. Darlington, Jr.
Crowward Mikulka
and
Robert E. Corb

ATTORNEYS

United States Patent Office 3,010,011
Patented Nov. 21, 1961

3,010,011
STUD WELDING PROCESS
Oscar H. Darlington, Jr., Merchantville, N.J., assignor to KSM Products, Inc., Merchantville, N.J., a corporation of New Jersey
Filed Aug. 31, 1959, Ser. No. 837,040
25 Claims. (Cl. 219—107)

This invention relates to novel and improved methods of electric arc stud welding.

This application concerns itself with electric arc stud welding processes of the type wherein a metallic stud and another metallic body or workpiece are held in contact and current of relatively high value and short duration is caused to flow and produce an arc between the stud and workpiece, raising the adjoining portions of the stud and workpiece to a melting temperature. Almost simultaneously, the melted portions of the stud and workpiece are pressed into intimate contact and are so held to complete the weld. Because current for welding processes of this type is usually provided by the discharge of a capacitor, such processes are generally characterized as "capacitance-discharge" stud welding processes.

One method of performing a welding cycle of this general type has been to advance the stud under a suitable biasing pressure toward the workpiece. Upon contact, there is created at the contacting surfaces a high-resistance path permitting the discharge of current stored by a capacitor under such circumstances as to dissipate or "burn off" a mass of metal at the point of contact and establish what may be best described as an arc, causing melting of the adjacent portions of the stud and workpiece. One method of providing a high-resistance path between the stud and workpiece has been to form the stud with one or more small projections on the end surface of the stud which contact the workpiece. When the capacitor is discharged through the stud, the projection provides a path for the initial flow of current and is dissipated or "burned off" almost instantly, forming a gap between the end surface of the stud and the adjacent surface of the workpiece across which the current continues to flow in the form of an arc.

In the foregoing method, however, many of the factors may be extremely critical to the extent that even slight variations from the optimum will materially and adversely affect the quality of the welds. In some applications of this method, creation of an arc must be followed immediately by the delivery of a percussive blow to the stud, in which case both the timing and force of the blow are critical. Accordingly, the apparatus for welding studs, particularly aluminum studs, by such methods is complex, expensive and difficult to maintain and operate. Additionally, a stud having one or more small projections on its end suffers from the obvious disadvantage that such projections represent an appreciable portion of the cost of manufacture of the stud, particularly when the shape and dimensions of the projections are extremely critical. The projections are necessarily small and, accordingly, are easily damaged or deformed, making such studs difficult and inconvenient to handle, package and use.

The invention has as objects: the provision of a novel and improved method of capacitance-discharge stud welding particularly adaptable to the welding of aluminum studs and characterized by its simplicity and freedom from the critical design and operating factors heretofore associated with capacitance-discharge stud welding; and the provision of a method of capacitance-discharge stud welding requiring substantially less power than methods known heretofore.

Other objects of the invention are: to provide a method of electric arc stud welding of the capacitance-discharge type wherein electrical contact is made between the convex end surface of a stud and the surface of a workpiece over only a narrow area at the perimeter of a recess in the surface of the workpiece; to provide a method of stud welding, as described, wherein a stud having a convex end surface is held in contact with the surface of a metallic workpiece at a line or lines defining the perimeter of a recess in the surface of the workpiece, said stud is biased toward said workpiece, and a capacitor is discharged through said stud and workpiece for melting adjoining portions thereof; to provide a method of stud welding as described wherein a ridge is upset at the perimeter of said recess and contact is made between said stud and workpiece only at said ridge; to provide a method of stud welding, substantially as described, employing a stud having a convex end surface which is substantially symmetrical with respect to an axis through said stud; to provide a method of stud welding, as described, wherein the convex end surface of the stud is a portion of a cone, sphere, revolved conic section, or polyhedron, and is substantially symmetrical with respect to an axis through the stud; to provide a method of stud welding, as described, wherein a recess is formed in the surface of the workpiece by a single punching operation; and to provide a method of stud welding, as described, for producing stronger and more reliable welds.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
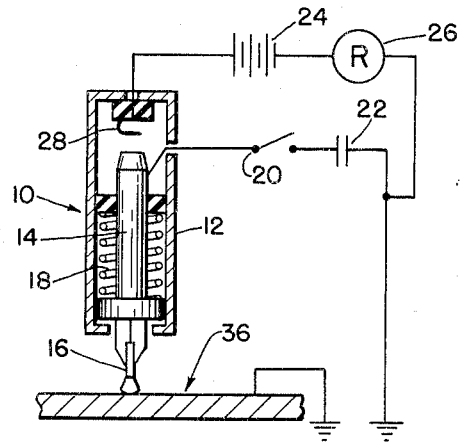
FIGURE 1 is a diagrammatic, sectional view of stud welding apparatus for performing the method of the invention.

The present invention resides in the provision of an improved method of capacitance-discharge stud welding by which it is possible to produce stronger and more reliable welds employing studs characterized by their simple and easily formed construction, and apparatus, the operation of which is neither complex nor critical. According to the invention, the studs employed are provided with convex end surfaces which may take a variety of shapes and which are easy to form, have non-critical dimensions, and are substantially immune to damage in the course of ordinary handling and use. The requisite high-resistance contact or electrical path between the stud and workpiece is achieved by causing the contact to be made between the stud and workpiece over a relatively small area, preferably a line, at the perimeter of a recess in the surface of the workpiece. The recess can be formed easily and rapidly, for example by a single punching operation, employing a punch similar to those generally used to mark the surfaces of metallic members. In fact, the punching operation may serve the added function of indicating the position on the workpiece at which the stud is to be welded, an operation which is frequently performed even though the recess in the workpiece made by the punch serves no other function.

The strength of the weld formed by capacitance-discharge methods is, at least in part, a function of the size of the areas of the adjoining surfaces of the stud and workpiece which are fused together by the welding operation. Accordingly, the size of the areas of melt should be as large as possible, and this may be facilitated by commencing the welding process with the largest possible area of the end surface of the stud located in close proximity to the surface of the workpiece. The convex end surface of the stud may be so formed as to make the smallest possible angle with respect to the surface of the workpiece and thereby bring the outer portions of the end surface closer to the surface of the workpiece and approach a condition of total contact as closely as possible consistent with providing a high-resistance contact between the convex end surface and the workpiece. This construction thus provides for an electrical contact between the stud and workpiece of sufficiently high resistance to give increased assurance that an arc will be started, while a closer approach is made to obtaining desirable conditions relating to the area of the end surface and the proximity thereof to the surface of the workpiece, to the end that there will be greater assurance of producing stronger and more uniform welds.

In welding methods of the present type, the welding current is usually caused to flow between the stud and workpiece across the high-resistance contact therebetween under such circumstances as to cause a portion of the stud in the region of the contact to be "burned off" almost instantly as the current starts to flow. The expression "burn off" is used herein and in the art to describe the phenomenon which occurs when current of high value flows between a contacting stud and workpiece in such a way as to instantly dissipate at least the portion of the stud contacting the workpiece. In addition to stud burn off, there may be some dissipation of the workpiece in the region of contact, particularly in the claimed process wherein a recess is formed in the workpiece. Following this initial "burn off," the current continues to flow between the stud and workpiece in a manner which can best be described as an arc, causing melting of the adjoining portions of the stud and workpiece, as well as some further dissipation or "burning off" of the stud and possibly of the workpiece. Although the stud is biased toward the workpiece throughout the actual welding operation, the initial burn off is so rapid that a gap may be created momentarily between the stud and workpiece, and it is across this gap that the welding current flows in the form of an arc.

Reference is now made to FIG. 1 of the drawing wherein there are illustrated the basic components of a stud welding apparatus of the type adapted to perform the method of the invention. This apparatus, shown and described in detail in the copending U.S. application of Frank K. Kelemen et al., Serial No. 756,655, filed August 22, 1958, now Patent No. 2,945,118, generally comprises a stud welding gun 10 and a circuit for operating the gun and supplying welding current thereto. Gun 10, in the form shown, comprises a housing 12 having a spindle 14 slidably mounted therein and including on its forward end means, such as a chuck, for holding a stud 16. A spring 18 is provided for urging spindle 14 forward in the housing. Spindle 14 is connected through a normally open switch or relay points 20 to a capacitor 22, the other side of which is grounded. A control circuit is provided comprising a source of current, indicated as a battery 24, and a relay 26 connected in series between a contact 28 at the rear of the gun housing and to ground. Spindle 14 is displaceable rearwardly within housing 12 so as to touch contact 28 and complete the circuit through relay 26 which controls the operation of points 20.

In the operation of the stud welding apparatus illustrated, stud 16, mounted in the forward end of spindle 14, is placed in contact with a metallic workpiece 36 connected to ground. Housing 12 is urged toward the workpiece against the bias of spring 18, compressing the latter so that the stud is biased toward the workpiece and spindle 14 is displaced rearwardly within the housing until it touches contact 28, completing the circuit through relay 26. Relay points 20, which are normally open, are closed when the relay is energized, completing the welding current circuit and allowing the capacitor to discharge a short surge of current of high value through the spindle, stud and workpiece.

Figure 3:
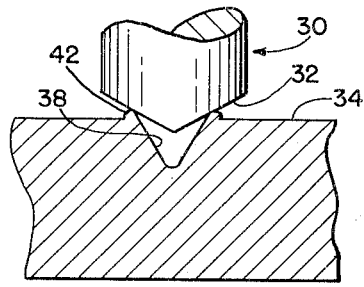
FIG. 3 is a fragmentary, schematic, sectional view illustrating another step in the method of the invention, together with a stud employed therein.
Figure 4:
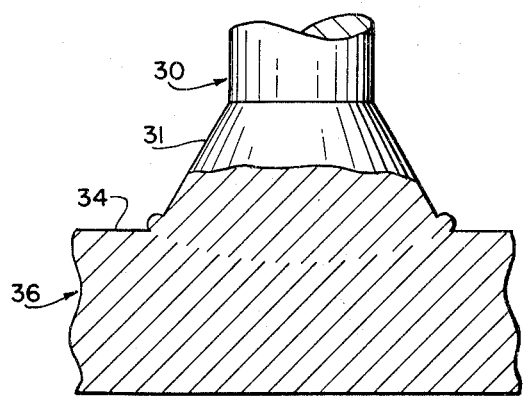
FIG. 4 is a fragmentary, schematic, sectional view, showing a welded stud at the completion of a welding cycle.

A stud typical of those employed in the method of the invention is illustrated in FIG. 3 of the drawing. Stud 30 may be formed of any of the ferrous or non-ferrous metals which are usually welded and may comprise, for example, aluminum or alloys thereof, for the welding of which the method of the present invention is particularly suited. Stud 30 may have a shank of any desired configuration or cross-sectional shape with the exception of the weld end portion to be welded. The stud may be generally cylindrical throughout its entire length or at least the weld end portion thereof; or it may tatke the form shown in FIG. 5 and be provided with a bulbous weld end section 31 adapted to provide more material and a greater area at the end of the stud where welding occurs.

Figure 5:
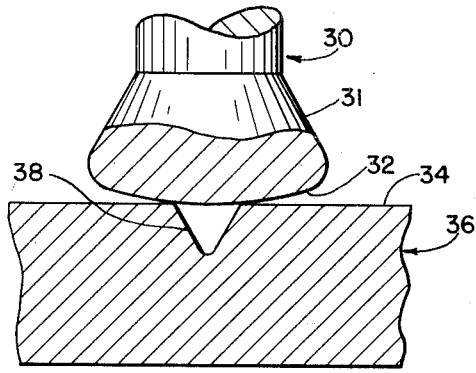
FIG. 5 is a view, similar to FIG. 3, illustrating the use of another form of stud in the method of the invention.

The end surface, designated 32, of the weld end section of the stud is convex and may take a number of different forms. In the preferred form shown in FIG. 3, the major portion of end surface 32 is a cone. However, the surface may comprise a portion of a sphere, as shown in FIG. 5, or a revolved conic section, or it may be spheroidal or polyhedral. The stud, or at least the weld end section thereof, is preferably symmetrical with respect to a longitudinal axis, and this preference for symmetry also applies to the end surface 32 whether the end surface be spherical, spheroidal, conical or polyhedral. In the welding method of the invention, as in conventional capacitance-discharge stud welding, stud 30 is preferably positioned with the axis thereof perpendicular to the surface 34 of a metallic workpiece 36 with a portion of end surface 32 in contact with surface 34 of the workpiece. For best results, surface 34 should be planar or as close thereto as possible, and the stud should be positioned with its axis as close as possible to the perpendicular. While perpendicularity between the stud and workpiece is preferred, it is not essential to the production of strong welds by the method of the invention, particularly when the end surface of the stud is spherical. In fact, a particular advantage of the present method resides in the fact that it is now possible, with the stud positioned at angles of as much as 20° from the perpendicular, to produce welds which are equal in strength to welds produced with the stud positioned perpendicularly to the workpiece.

Figure 2:
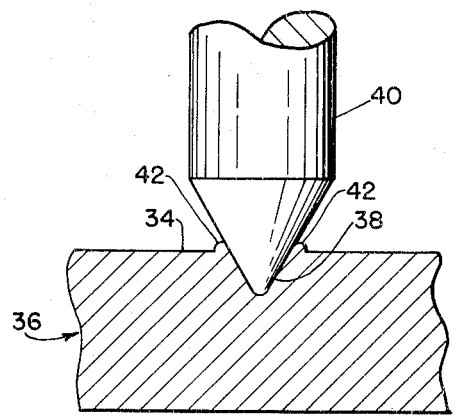
FIG. 2 is a fragmentary, schematic, sectional view illustrating a step in said method.

The high-resistance electrical contact between the stud and workpiece is achieved by forming a recess in surface 34 of the workpiece. This recess, designated 38, may be formed by any convenient method, including, for example, drilling and punching. A preferred method is illustrated in FIG. 2 and comprises forming recess 38 by a single punching operation in which the tapered tip of a punch 40 is driven into the surface of the workpiece. The configuration of the tip of the punch, and hence the recess formed thereby, can be of any desired shape, for example pyramidal, spheroidal or polygonal. In the preferred form shown, the recess formed by the punching operation is substantially conical, and the operation is performed in such a manner that metal of the workpiece is upset into the form of an outwardly projecting ridge 42 at the perimeter of recess 38.

As previously noted, it may be desirable to locate as much as possible of the end surface of the stud in close proximity to the surface of the workpiece, while restricting the actual area of contact so that the contact between the stud and workpiece will have a relatively high electrical resistance. This may be accomplished by so forming end surface 32 that, when the stud is positioned for welding, the angle of contact between the end surface and surface 34 of the workpiece will be relatively small, for example 20° or less. This "contact angle," for a symmetrical stud configuration, that is, an end surface which is the surface of revolution of a conic section or a surface which is a cone, is measured in any plane through the axis of revolution of the conic section or the axis of the cone itself. The contact angle for a conical end surface (FIG. 3) may be expressed as the angle subtended by the end surface of the stud and the surface of the workpiece at the intersection of the axis of the end surface and the surface of the workpiece. For other forms of end surfaces, such as the spherical surface shown in FIG. 5, this angle may be defined as the "mean angle of contact" and, as the expression implies, is an average angle for spherical, spheroidal, and other surfaces of revolution. In instances where the stud configuration is not symmetrical with respect to an axis through the stud, the angle of contact can be defined as the angle or mean angle between the end surface of the stud and the surface of the workpiece measured in any plane perpendicular to the surface of the workpiece and passing through the center of the area of contact between the stud and workpiece.

During the welding operation following initial burn off, an additional portion of the end of the stud is dissipated and/or is burned off or melted or displaced while the stud is being moved toward the workpiece so that, upon completion of the welding operation, fusion between the stud and workpiece should occur at the portion of the stud having the largest cross-sectional area or, in the case of a round stud, the largest diameter. In other words, when the weld is complete, the surface of the workpiece should be substantially in a plane through the stud where the cross-sectional area of the stud is largest, thereby providing the greatest possible area of weld. In the case of studs having spherical, spheroidal or polyhedral end surfaces, the mean angle of contact is an inverse function of the radius or mean radius of curvature of the end surface. This radius of curvature, in the form of symmetrical stud (shown in FIG. 5) having a round cross section and a spherical end surface, is at least equal to, and preferably greater than, the largest radius of the stud.

In order that contact between the stud and workpiece will occur only at the perimeter of the recess in the workpiece, the angle of the conic end surface of the stud should be greater than the angle of the conic recess in the workpiece. While the angle of conic end surface 32 is variable over a considerable range from a minimum of approximately 90° to a maximum of 172°, a preferred angle for end surface 32, particularly in aluminum studs, is approximately 120° so that the angle of contact between the stud and workpiece will be approximately 30°.

The depth of the recess formed in the workpiece, while not being critical, should be such as to preclude the creation of a void between the stud and workpiece during the welding operation. The maximum width or diameter of recess 38 should occur at surface 32 and may range between 10% and 85% of the maximum diameter of the weld end of the stud and is preferably approximately 30% of the maximum diameter, particularly in aluminum studs. The configuration of the recess, while being shown as generally conical, can take other forms and can be, for example, pyramidal, spheroidal and polyhedral. In the welding method of the invention, when the stud is held in contact with the workpiece, a very small and narrow area or portion of the end surface of the stud contacts the workpiece. This contacting portion at the perimeter of the recess in the surface of the workpiece approximates a line or lines depending on the configuration of the recess and, to some extent, on the angle between the stud and the workpiece. When the end surface of the stud is spherical, speroidal or conical and the recess is round, as is the case with a conic recess, and the stud is positioned approximately perpendicularly to the surface of the workpiece so that the axis of the stud and the axis of the conic recess are coincident, the line of contact will be a circle.

In the case of studs with spherical or spheroidal end surfaces, the relationships between the recess width or diameter and the maximum stud diameter previously stated with respect to conic end surfaces are still applicable. However, the shape of the recess becomes less critical insofar as the angle of its sides is concerned because of the impossibility of the spherical end surface of the stud contacting the workpiece at any place other than at the perimeter of the recess. The radius of the spherical end surface may vary between a minimum of one-half the maximum diameter of the weld end and a maximum of several times the maximum diameter of the weld end. An optimum radius for a spherical end surface or the portion of a spheroidal end surface which contacts the workpiece, particularly for aluminium studs, is approximately seven-tenths of the maximum diameter of the weld end. The formation of a recess with a raised ridge at its perimeter may allow the preferred contact angle between the stud and workpiece to be reduced to some extent inasmuch as the ridge contributes to spacing the major portion of the end surface of the stud further away from the surface of the workpiece at the commencement of the welding operation.

It will be noted that the studs discussed are all formed with relatively blunt, convex end surfaces whose geometries are neither complex nor critical. Studs with projections are generally difficult to fabricate and are easily damaged. The recess in the surface of the workpiece can be formed rapidly and simply at any time prior to welding and, of course, is practically immune to damage or deformation. Where a ridge is formed at the perimeter of the recess, the height of the ridge should be comparatively small, on the order of a few thousandths of an inch. The configuration of the ridge is not critical, and deformation or destruction of the ridge will have little or no effect on the welding operation or the strength of the completed weld. The dimensions of the recess are such as to allow it to be formed manually. In most cases this is done with a punch and hammer but can also be accomplished by drilling or with a simple punching device.

Although the method of the invention, the studs employed therein, and the recesses formed in the workpiece have been discussed with particular reference to their applicability to the welding of aluminum and aluminum alloys, it should be understood that the invention has equal applicability to the welding of other nonferrous and ferrous metals. Of course, it may be necessary to vary the operating factors, such as biasing force and capacitance, and the optimum geometry of the stud within the limits set forth, depending on the particular metal being employed.

The actual welding operation is accomplished rapidly and in a very short period of time. Following formation of a recess in the surface of the workpiece and positioning of the stud in contact with the workpiece overlying the recess, the stud is biased toward the workpiece and a surge of current of high value and short duration, measured in fractions of a second, is caused to pass through the stud and workpiece at the high-resistance contact therebetween. As this occurs, a portion of the stud and possibly the workpiece in the region of the recess are instantly dissipated or initially burned off, creating a gap between the stud and workpiece. The current then flows in the form of an arc between the end of the stud and the workpiece, melting adjoining portions thereof as the stud is being moved toward the workpiece. Since the stud is biased toward the workpiece throughout the welding operation, these melted portions of the stud and workpiece are immediately forced into intimate contact and become inseparable when the molten metal solidifies to complete the weld.

Since certain changes may be made in the above process without departing from the scope of the invention herein involved, it is intended that all matter contained in the above description or shown in the accompanying drawing shall be interpreted as illustrative and not in a limiting sense.

What is claimed is:

1. The method of electric arc stud welding comprising making an electrical contact between the surface of a workpiece and the convex end surface of a stud over only a narrow area at the perimeter of a recess in the surface of said workpiece, biasing said stud toward said workpiece and, while said stud is so biased, passing current from a capacitor through said stud and workpiece to produce an arc between said stud and workpiece for melting adjacent portions thereof in the region of said arc, forcing the last-mentioned melted portions of said stud and workpiece into intimate contact, and maintaining said last-mentioned portions in intimate contact until said last-mentioned portions fuse together and solidify.

2. The stud welding method of claim 1 wherein a high-resistance electrical contact is made between said stud and workpiece over a narrow area approximating a line at the perimeter of said recess.

3. The stud welding method of claim 1 wherein said end surface of said stud includes a continuously curved convex portion and contact is made between said stud and said workpiece at said curved convex portion.

4. The stud welding method of claim 1 wherein said recess is formed in said workpiece by forcing the convex end portion of a punch into said workpiece.

5. The stud welding method of claim 4 wherein said convex end portion of said punch is forced into said workpiece in such a manner as to upset a portion thereof into the form of a ridge at the perimeter of said recess and contact is made between said stud and workpiece only at said ridge.

6. The stud welding method of claim 1 wherein said end surface of said stud comprises at least a portion of a surface of revolution of a curved conic section, said recess is formed symmetrically about an axis substantially perpendicular to the surface of said workpiece, and during the welding operation, said stud and workpiece are positioned in contact with one another with the last-mentioned axis and the axis of revolution of said conic section substantially in colinear relation.

7. The stud welding method of claim 6 wherein said end surface is so formed and positioned in contact with said surface of said workpiece that the mean angle of contact between the last-mentioned surface and said end surface is within the range 4° to 45°.

8. The stud welding method of claim 1 wherein said recess is formed with a substantially circular perimeter and contact is made between said stud and workpiece over an area substantially coextensive with said perimeter.

9. The stud welding method of claim 1 wherein said end surface of said stud comprises at least a portion of a cone and is so positioned in contact with the surface of said workpiece that the angle of contact between said last-mentioned surface and said end surface is within the range 4° to 45°.

10. The stud welding method of claim 1 wherein said end surface of said stud is cone shaped, said recess in said surface of said workpiece is generally conical, the angle of the conic surface of said stud is substantially greater than the angle of the conic recess, and, during the welding operation, said stud and workpiece are positioned with respect to one another with the axis of said stud and said conic recess in colinear relation.

11. The method of electric arc welding of a stud comprising a metal selected from the class consisting of aluminum and aluminum alloys and having a weld end portion including a convex end surface, said method comprising forming a recess in the surface of a metallic workpiece to which said stud is to be welded, said recess being formed with a substantially circular perimeter having a diameter equal to approximately one-third of the maximum width of said weld end portion of said stud, so positioning said convex portion of said end surface in contact with said surface of said workpiece as to make an electrical contact therebetween over only a narrow area at the perimeter of said recess, biasing said stud toward said workpiece and, while said stud is so biased, passing current from a capacitor through said stud and workpiece to produce an arc between said stud and workpiece for melting adjacent portions thereof in the region of said arc, forcing the last-mentioned melted portions of said stud and workpiece into intimate contact, and maintaining said last-mentioned portions in intimate contact until said last-mentioned portions fuse together and solidify.

12. The stud welding method of claim 11 wherein said end surface of said stud is conic and subtends an angle, measured in a plane including the axis of said conic surface, of between 115° and 125°, and said stud is positioned in contact with the surface of said workpiece with said axis of said conic surface substantially perpendicular to said surface of said workpiece.

13. The stud welding method of claim 12 wherein said angle of said conic surface is approximately 120°.

14. The stud welding method of claim 11 wherein said end surface comprises at least a portion of a sphere having a radius equal to approximately seven-tenths of the maximum width of said weld end portion of said stud.

15. The stud welding method of claim 11 wherein said end surface of said stud comprises at least a portion of the surface of revolution of a curved conic section and said end surface is so shaped and positioned in contact with said workpiece that the mean angle of contact between said end surface and the surface of said workpiece is approximately 30°.

16. The method of electric arc stud welding utilizing a stud having a convex end surface comprising at least a portion of the surface of revolution of a curved conic section, which method comprises forming a recess in the surface of a metallic workpiece to which said stud is to be welded; so positioning said convex end surface in contact with said surface of said workpiece as to make an electrical contact therebetween over only a narrow area at the perimeter of said recess; biasing said stud toward said workpiece; while said stud is so biased, discharging a capacitor through said stud and workpiece to produce an arc of short duration between said stud and workpiece for melting adjacent portions thereof in the region of said arc; and while the last-mentioned portions are in a molten state, forcing said last-mentioned portions together and maintaining them together until they solidify and the weld is completed.

17. The stud welding method of claim 16 wherein said recess is formed symmetrically about an axis, and during the welding operation, said stud and workpiece are positioned with respect to one another with said axis and the axis of revolution of said conic section substantially in colinear relation.

18. The stud welding method of claim 17 wherein said recess is formed in said workpiece with said axis of said recess substantially perpendicular to said surface of said workpiece.

19. The stud welding method of claim 17 wherein said convex end surface is so formed and positioned in contact with said surface of said workpiece that the mean angle of contact between the last-mentioned surface and said end surface is within the range 4° to 45°.

20. The stud welding method of claim 16 wherein said recess is formed with a substantially circular perimeter and contact is made between said stud and workpiece over only an area substantially coextensive with said perimeter.

21. The stud welding method of claim 16 wherein a portion of said workpiece is upset to form an outwardly projecting ridge at the perimeter of said recess and electrical contact is made between said stud and workpiece only at said ridge.

22. The stud welding method of claim 16 wherein said recess is formed in said workpiece by forcing the convex end portion of a punch into said workpiece.

23. The stud welding method of claim 22 wherein said convex end portion of said punch is forced into said workpiece in such a manner as to upset a portion thereof into the form of a ridge at the perimeter of said recess and contact is made between said stud and workpiece only at said ridge.

24. The method of electric arc stud welding utilizing a stud comprising a material selected from the class consisting of aluminum and aluminum alloys and having a weld end portion including a convex end surface comprising at least a portion of the surface of revolution of a curved conic section, which method comprises forming a recess in the surface of a metallic workpiece at a position thereon where said stud is to be welded, said recess being formed with a substantially circular perimeter having a diameter equal to approximately one-third of the maximum width of said weld end portion of said stud, so positioning said convex end surface in contact with said surface of said workpiece as to make electrical contact therebetween over only a narrow area at the perimeter of said recess, biasing said stud toward said workpiece and, while said stud is so biased, discharging a capacitor through said stud and workpiece to produce an arc of short duration between said stud and workpiece for melting adjacent portions thereof in the region of said arc, and while the last-mentioned portions are in a molten state, forcing said last-mentioned portions into intimate contact and so maintaining them until said last-mentioned portions solidify and the weld is completed.

25. The stud welding method of claim 24 wherein said end surface of said stud is so shaped and positioned in contact with said workpiece that the mean angle of contact between said end surface and the surface of said workpiece is approximately 30°.

References Cited in the file of this patent
UNITED STATES PATENTS

| | | |
|---|---|---|
| 1,142,241 | Ellinger | June 8, 1915 |
| 2,202,405 | Smith | May 28, 1940 |
| 2,321,201 | Heilman | June 8, 1943 |
| 2,563,107 | Fanger | Aug. 7, 1951 |
| 2,584,491 | Nelson | Feb. 5, 1952 |
| 2,623,974 | Prucha | Dec. 30, 1952 |